United States Patent
Matsumura et al.

(10) Patent No.: US 12,256,336 B2
(45) Date of Patent: Mar. 18, 2025

(54) TERMINAL AND A RADIO COMMUNICATION METHOD IN NEXT-GENERATION MOBILE COMMUNICATION SYSTEMS

(71) Applicant: NTT DOCOMO, INC., Tokyo (JP)

(72) Inventors: Yuki Matsumura, Tokyo (JP); Yuichi Kakishima, Palo Alto, CA (US); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 404 days.

(21) Appl. No.: 17/775,092

(22) PCT Filed: Nov. 8, 2019

(86) PCT No.: PCT/JP2019/044018
§ 371 (c)(1),
(2) Date: May 6, 2022

(87) PCT Pub. No.: WO2021/090505
PCT Pub. Date: May 14, 2021

(65) Prior Publication Data
US 2022/0394626 A1  Dec. 8, 2022

(51) Int. Cl.
*H04W 52/24* (2009.01)
*H04W 52/14* (2009.01)
*H04W 72/04* (2023.01)

(52) U.S. Cl.
CPC ....... *H04W 52/242* (2013.01); *H04W 52/146* (2013.01); *H04W 72/04* (2013.01)

(58) Field of Classification Search
CPC ............. H04W 52/242; H04W 52/146; H04W 52/325; H04W 72/23; H04W 52/365; H04W 52/50; H04W 52/08; H04W 52/42; H04W 72/0473; H04W 52/245; H04W 24/08; H04W 52/54; H04W 72/04; H04W 52/14; H04W 52/383; H04W 52/24;
(Continued)

(56) References Cited

U.S. PATENT DOCUMENTS 12,057,917 B2 * 8/2024 Uchino ................. H04W 76/19
12,058,624 B2 * 8/2024 Matsumura ......... H04W 52/242
(Continued)

FOREIGN PATENT DOCUMENTS

JP    2019-062506 A    4/2019

OTHER PUBLICATIONS

International Search Report issued in PCT/JP2019/044018 on Jul. 7, 2020 (3 pages).
(Continued)

*Primary Examiner* — Golam Sorowar
(74) *Attorney, Agent, or Firm* — Osha Bergman Watanabe & Burton LLP

(57) ABSTRACT

A terminal according to an aspect of the present disclosure includes a receiving section that receives a pathloss reference signal, and a control section that calculates a pathloss for transmission power control on the basis of layer 1 (L1)-reference signal received power (RSRP) for the pathloss reference signal when the pathloss reference signal is updated by a media access control-control element (MAC CE), and a measurement condition is met. According to an aspect of the present disclosure, the pathloss can be appropriately calculated.

4 Claims, 9 Drawing Sheets

(58) Field of Classification Search
CPC .......... H04W 72/0446; H04W 74/0833; H04L 5/0048; H04L 5/0051; H04L 5/0094; H04L 5/005; H04L 5/0053; H04L 5/0055; H04L 5/001; H04L 5/0091; H04L 25/0226; H04L 5/0005; H04L 5/0057; H04L 27/2662; H04L 5/0023; H04B 17/309; H04B 7/0626; H04B 17/327; H04B 7/0486; H04B 7/0639; H04B 7/0695; H04B 7/0617; H04B 7/0426; H04B 7/088; H04B 17/103

See application file for complete search history.

(56) References Cited

U.S. PATENT DOCUMENTS

| | | | | |
|---|---|---|---|---|
| 2019/0223049 | A1* | 7/2019 | Zhang | H04W 72/04 |
| 2020/0163023 | A1* | 5/2020 | Pelletier | H04W 52/38 |
| 2020/0205093 | A1* | 6/2020 | Kim | H04W 52/42 |
| 2022/0279450 | A1* | 9/2022 | Zhang | H04B 7/0404 |
| 2022/0394499 | A1* | 12/2022 | Matsumura | H04L 5/0051 |

OTHER PUBLICATIONS

Written Opinion of the International Searching Authority issued in PCT/JP2019/044018 on Jul. 7, 2020 (4 pages).
Apple Inc.; "Remaining Issues on Multi-beam operation"; 3GPP TSG-RAN WG1 Meeting #98bis, R1-1910969; Chongqing, China; Oct. 14-20, 2019 (15 pages).
LG Electronics; "Feature lead summary#4 of Enhancements on Multi-beam Operations"; 3GPP TSG RAN WG1 Meeting #98bis, R1-1911561; Chongqing, China; Oct. 14-20, 2019 (27 pages).
Futurewei; "On multi-beam operation enhancements"; 3GPP TSG RAN WG1 Meeting #98bis, R1-1910919; Chongqing, China; Oct. 14-18, 2019 (8 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Office Action in the counterpart Chinese Application No. 201980103013.2, mailed Apr. 27, 2023 (22 pages).

* cited by examiner

|  | CELL DETECTION | RSRP DETECTION | SSB INDEX DETECTION |
|---|---|---|---|
| LTE | 600ms | 200ms | N/A |
| NR (FR1) w/o DRX | max( 600ms, ceil( $5 \times K_p$) $\times$ SMTC period ) $\times$ CSSF$_{intra}$ | max( 200ms, ceil( $5 \times K_p$) $\times$ SMTC period ) $\times$ CSSF$_{intra}$ | max( 120ms, ceil( $3 \times K_p$) $\times$ SMTC period ) $\times$ CSSF$_{intra}$ |
| NR (FR2) w/o DRX | max( 600ms, ceil($M_{pss/sss\_sync\_w/o\_gaps} \times K_p \times K_{RLM}$) $\times$ SMTC period ) $\times$ CSSF$_{intra}$ | max( 200ms, ceil($M_{meas\_period\_w/o\_gaps} \times K_p \times K_{RLM}$) $\times$ SMTC period ) $\times$ CSSF$_{intra}$ | |

| CONDITION | THE NUMBER OF SAMPLES |
|---|---|
| CASE THAT timeRestrictionForChannelMeasurements IS CONFIGURED, OR RS for L1-RSRP MEASUREMENT IS APERIODIC CSI-RS | 1 |
| OTHER CASES | 3 |

FIG. 2B

| CONDITION | SCALING FACTOR IN CONSIDERATION OF UE RECEIVE BEAM SWITCHING |
|---|---|
| CSI-RS based reporting | 1 |
| SSB based reporting | 8 |
| CSI-RS WITH REPETITION ON AND THE NUMBER OF CSI-RS RESOURCES < maxNumberRxBeam | ceil(maxNumberRxBeam / THE NUMBER OF CSI-RS RESOURCES) |

FIG. 3A

Measurement period $T_{L1\text{-}RSRP\_Measurement\_Period\_SSB}$ for FR1

| Configuration | $T_{L1\text{-}RSRP\_Measurement\_Period\_SSB}$ (ms) |
|---|---|
| non-DRX | $\max(T_{Report}, \text{ceil}(M*P)*T_{SSB})$ |
| DRX cycle ≤ 320ms | $\max(T_{Report}, \text{ceil}(1.5*M*P)*\max(T_{DRX}, T_{SSB}))$ |
| DRX cycle > 320ms | $\text{ceil}(M*P)*T_{DRX}$ |
| Note: $T_{SSB}$ = ssb-periodicityServingCell is the periodicity of the SSB -Index configured for L1 -RSRP measurement. $T_{DRX}$ is the DRX cycle length. $T_{Report}$ is configured periodicity for reporting. | |

FIG. 3B

Measurement period $T_{L1\text{-}RSRP\_Measurement\_Period\_SSB}$ for FR2

| Configuration | $T_{L1\text{-}RSRP\_Measurement\_Period\_SSB}$ (ms) |
|---|---|
| non-DRX | $\max(T_{Report}, \text{ceil}(M*P*N)*T_{SSB})$ |
| DRX cycle ≤ 320ms | $\max(T_{Report}, \text{ceil}(1.5*M*P*N)*\max(T_{DRX}, T_{SSB}))$ |
| DRX cycle > 320ms | $\text{ceil}(1.5*M*P*N)*T_{DRX}$ |
| Note: $T_{SSB}$ = ssb-periodicityServingCell is the periodicity of the SSB -Index configured for L1 -RSRP measurement. $T_{DRX}$ is the DRX cycle length. $T_{Report}$ is configured periodicity for reporting. | |

FIG. 4A

Measurement period $T_{L1\text{-}RSRP\_Measurement\_Period\_CSI\text{-}RS}$ for FR1

| Configuration | $T_{L1\text{-}RSRP\_Measurement\_Period\_CSI\text{-}RS}$ (ms) |
|---|---|
| non-DRX | $\max(T_{Report}, \text{ceil}(M*P)*T_{CSI\text{-}RS})$ |
| DRX cycle ≤ 320ms | $\max(T_{Report}, \text{ceil}(1.5*M*P)*\max(T_{DRX}, T_{CSI\text{-}RS}))$ |
| DRX cycle > 320ms | $\text{ceil}(M*P)*T_{DRX}$ |
| Note 1: $T_{CSI\text{-}RS}$ is the periodicity of CSI-RS configured for L1-RSRP measurement. $T_{DRX}$ is the DRX cycle length. $T_{Report}$ is configured periodicity for reporting.<br>Note 2: the requirements are applicable provided that the CSI-RS resource configured for L1 -RSRP measurement is transmitted with Density = 3. | |

FIG. 4B

Measurement period $T_{L1\text{-}RSRP\_Measurement\_Period\_CSI\text{-}RS}$ for FR2

| Configuration | $T_{L1\text{-}RSRP\_Measurement\_Period\_CSI\text{-}RS}$ (ms) |
|---|---|
| non-DRX | $\max(T_{Report}, \text{ceil}(M*P*N)*T_{CSI\text{-}RS})$ |
| DRX cycle ≤ 320ms | $\max(T_{Report}, \text{ceil}(1.5*M*P*N)*\max(T_{DRX}, T_{CSI\text{-}RS}))$ |
| DRX cycle > 320ms | $\text{ceil}(M*P*N)*T_{DRX}$ |
| Note 1: $T_{CSI\text{-}RS}$ is the periodicity of CSI-RS configured for L1-RSRP measurement. $T_{DRX}$ is the DRX cycle length. $T_{Report}$ is configured periodicity for reporting.<br>Note 2: the requirements are applicable provided that the CSI-RS resource configured for L1 -RSRP measurement is transmitted with Density = 3. | |

TERMINAL AND A RADIO COMMUNICATION METHOD IN NEXT-GENERATION MOBILE COMMUNICATION SYSTEMS

TECHNICAL FIELD

The present disclosure relates to a terminal and a radio communication method in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G)," "5G+ (plus)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, NR), it is studied that a UE calculates a pathloss for transmission power control for uplink (UL) transmission based on measurement results of downlink (DL) reference signal (RS).

However, an accuracy of the pathloss may reduce depending on an update frequency of DL-RS. The reduction in the accuracy of the pathloss may cause reduction in a system performance such as reduction in a throughput.

In view of these, an object of the present disclosure is to provide a terminal and a radio communication method capable of appropriately calculating a pathloss.

Solution to Problem

A terminal according to an aspect of the present disclosure includes a receiving section that receives a pathloss reference signal, and a control section that calculates a pathloss for transmission power control on the basis of layer 1 (L1)-reference signal received power (RSRP) for the pathloss reference signal when the pathloss reference signal is updated by a media access control-control element (MAC CE), and a measurement condition is met.

Advantageous Effects of Invention

According to an aspect of the present disclosure, the pathloss can be appropriately calculated.

BRIEF DESCRIPTION OF DRAWINGS

FIG. 1 is a diagram to show an example of a measurement delay requirement in inter-frequency measurement;

FIGS. 2A and 2B are diagrams to show examples of the number of samples in L1-RSRP measurement and a scaling factor in consideration of UE receive beam switching;

FIGS. 3A and 3B are diagrams to show examples of an L1-RSRP measurement period on the basis an SSB;

FIGS. 4A and 4B are diagrams to show examples of an L1-RSRP measurement period on the basis of a CSI-RS;

DESCRIPTION OF EMBODIMENTS (Transmission Power Control)

<PUSCH Transmission Power Control>

Figure 5:
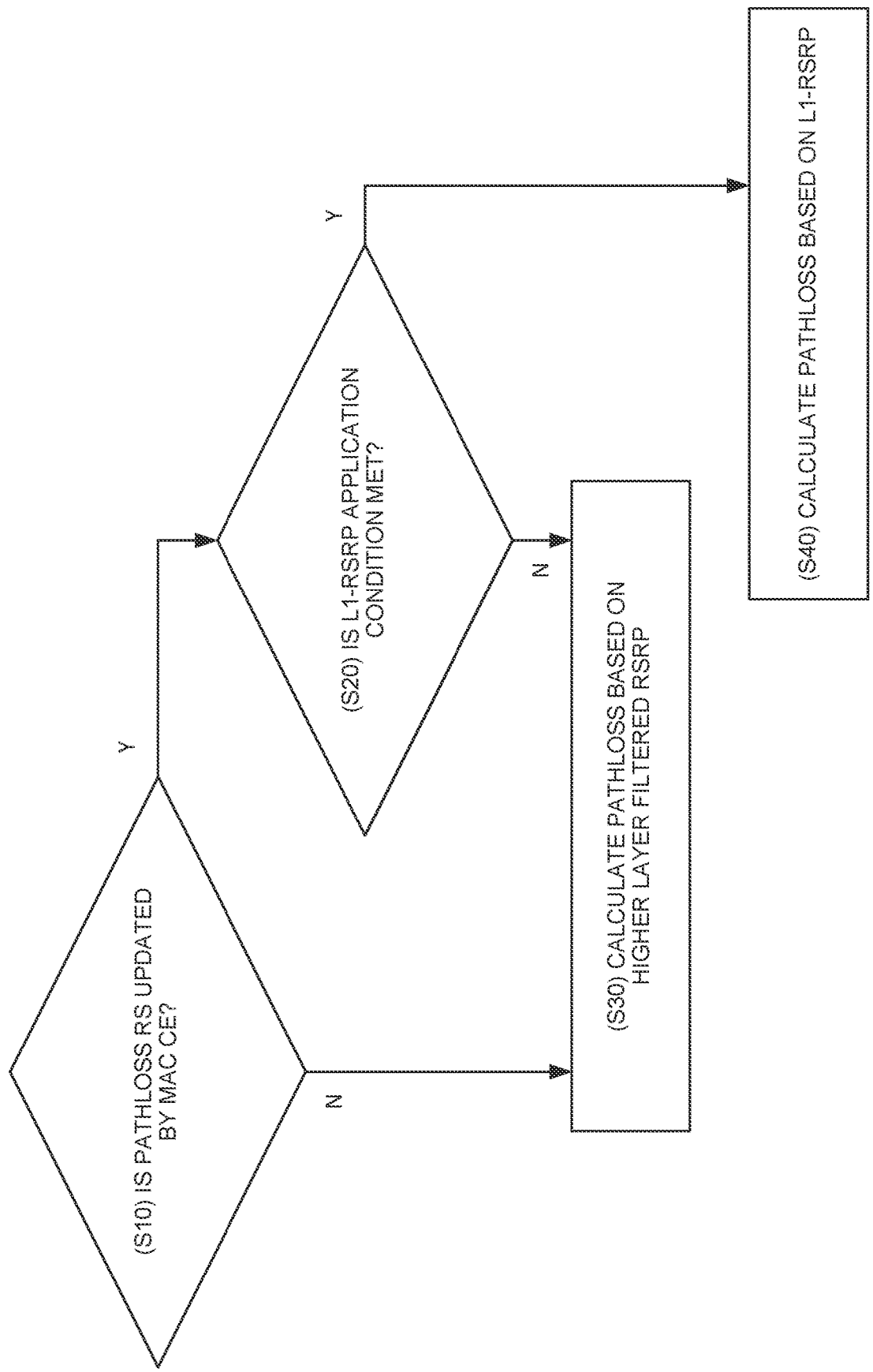
FIG. 5 is a diagram to show an example of a pathloss calculation method.

In NR, a PUSCH transmission power is controlled on the basis of a TPC command (also referred to as a value, increase-decrease value, correction value, or the like) indicated by a value in a certain field in DCI (also referred to as a TPC command field, or the like).

For example, in a case that the UE uses a parameter set having an index j (open loop parameter set) and an index l of a power control adjustment state (PUSCH power control adjustment state) to transmit a PUSCH on an active UL BWP b of a carrier f of a serving cell c, a PUSCH transmission power ($P_{PUSCH, b, f, c}(i, j, q_d, l)$) in a PUSCH transmission occasion i (also referred to as transmission duration or the like) may be expressed by Equation (1) below. The power control adjustment state may be referred to as a value based on the TPC command having the power control adjustment state index l, an accumulated value of the TPC command, and a value by a closed loop. l may be referred to as a closed loop index.

The PUSCH transmission occasion i is a duration in which a PUSCH is transmitted, and may include for example, one or more symbols, one or more slots, and the like.

[Math. 1]

$$P_{PUSCH,b,f,c}(i, j, q_d, l) = \min \begin{Bmatrix} P_{CMAX,f,c}(i), \\ P_{O\_PUSCH,b,f,c}(j) + 10\log_{10}\left(2^{\mu} \cdot M_{RB,b,f,c}^{PUSCH}(i)\right) + \\ \alpha_{b,f,c}(j) \cdot PL_{b,f,c}(q_d) + \Delta_{TF,b,f,c}(i) + f_{b,f,c}(i, l) \end{Bmatrix}$$

Equation (1)

Here, $P_{CMAX, f, c(i)}$ represents, for example, a transmission power of a user terminal configured for the carrier f of the serving cell c in the transmission occasion i (also referred to as a maximum transmission power, a UE maximum output power, or the like). $P_{O\_PUSCH, b, f, c}(j)$ represents, for example, a parameter for a target received power configured for the active UL BWP b of the carrier f of the serving cell c in the transmission occasion i (also referred to as, for example, a parameter for a transmission power offset, a transmission power offset P0, a target received power parameter, or the like).

$M^{PUSCH}_{RB, b, f, c}(i)$ represents, for example, the number of resource blocks (bandwidth) allocated to a PUSCH for the transmission occasion i in the active UL BWP b of the carrier f of the serving cell c and a subcarrier spacing μ. $\alpha_{b, f, c}(j)$ represents a value provided by a higher layer parameter (also referred to as, for example, msg3-Alpha, p0-PUSCH-Alpha, a fractional factor, or the like).

$PL_{b, f, c}(q_d)$ represents, for example, a pathloss (pathloss estimation [dB], pathloss compensation) calculated by the user terminal using the index $q_d$ of a reference signal (RS) (pathloss reference RS, pathloss RS, PUSCH-PathlossReferenceRS) for downlink BWP associated with the active UL BWP b of the carrier f of the serving cell c.

In a case that the UE is not provided with the pathloss reference RS (for example, PUSCH-PathlossReferenceRS), or the UE is not provided with the dedicated higher layer parameter, the UE may calculate $PL_{b, f, c}(q_d)$ using an RS resource from a synchronization signal (SS)/physical broadcast channel (PBCH) block (SS block (SSB)) used for obtaining a Master Information Block (MIB).

In a case that the UE is configured with the RS resource indices the number of which is up to a value of the maximum number of pathloss reference RSs (for example, maxNrof-PUSCH-PathlossReferenceRS) and a set of RS configurations for the respective RS resource indices by the pathloss reference RS, a set of RS resource indices may include one of or both a set of SS/PBCH block indices and a set of channel state information (CSI)-reference signal (RS) resource indices. The UE may identify the RS resource index $q_d$ in the set of RS resource indices.

In a case that the PUSCH transmission is scheduled by a Random Access Response (RAR) UL grant, the UE may use the same RS resource index $q_d$ as for the corresponding PRACH transmission.

In a case that the UE is provided with a configuration of PUSCH power control (for example, SRI-PUSCH-PowerControl) by a sounding reference signal (SRS) resource indicator (SRI) and the pathloss reference RS ID having a value of 1 or more, the UE may obtain mapping between a set of values for the SRI field in DCI format 0_1 and a set of pathloss reference RS ID values from higher layer signaling (for example, sri-PUSCH-PowerControl-Id in SRI-PUSCH-PowerControl). The UE may determine the RS resource index $q_d$ from the pathloss reference RS ID mapped to the SRI field value in DCI format 0_1 scheduling the PUSCH.

In a case that a PUSCH transmission is scheduled by DCI format 0_0 and the UE is not provided with the PUCCH spatial relation information for the PUCCH resource having the lowest index for the active UL BWP b of each carrier f and serving cell c, the UE may use the RS resource index $q_d$ the same as the PUCCH transmission in the PUCCH resource.

In a case that a PUSCH transmission is scheduled by DCI format 0_0 and the UE is not provided with a spatial setting for a PUCCH transmission, or a PUSCH transmission is scheduled by DCI format 0_1 not including the SRI field, or a configuration of PUSCH power control by the SRI is not provided to the UE, the UE may use the RS resource index $q_d$ having the pathloss reference RS ID equal to zero.

In a case that a configured grant configuration (for example, ConfiguredGrantConfig) includes a certain parameter (for example, rrc-CofiguredUplinkGrant) for a PUSCH transmission configured by the configured grant configuration, the RS resource index $q_d$ may be provided to the UE by the pathloss reference index (for example, pathlossReferenceIndex) in the certain parameter.

In a case that the configured grant configuration does not include the certain parameter for the PUSCH transmission configured by the configured grant configuration, the UE may determine the RS resource index $q_d$ from the pathloss reference RS ID value mapped to the SRI field in the DCI format activating the PUSCH transmission. In a case that the DCI format does not include the SRI field, the UE may determine the RS resource index $q_d$ having the pathloss reference RS ID equal to zero.

$\Delta_{TF, b, f, c}(i)$ represents a transmission power adjustment component for the UL BWP b of the carrier f of the serving cell c (offset, transmission format compensation).

$f_{b, f, c}(i, l)$ represents a PUSCH power control adjustment state for the active UL BWP b of the carrier f of the serving cell c in the transmission occasion i. For example, $f_{b, f, c}(i, l)$ may be expressed by Equation (2).

[Math. 2]

$$f_{b,f,c}(i, l) = f_{b,f,c}(i - i_0, l) + \sum_{m=0}^{C(D_i)-1} \delta_{PUSCH,b,f,c}(m, l)$$

Equation (2)

Here, $\delta_{PUSCH, b, f, c}(i, l)$ may represent a TPC command value included in DCI format 0_0 or DCI format 0_1 scheduling the PUSCH transmission occasion i on the active UL BWP b of the carrier f of the serving cell c, or a TPC command value combined and coded with another TPC command in DCI format 2_2 having a CRC scrambled by a specific RNTI (Radio Network Temporary Identifier) (for example, TPC-PUSCH-RNTI).

$\sum_{m=0}^{C(D_i)-1} \delta_{PUCCH, b, f, c}(m, l)$ may represent a sum of TPC command values in a set $D_i$ of the TPC command values having cardinalities $C(D_i)$. $D_i$ may represent a set of TPC command values the UE receives between $K_{PUSCH}(i-i_0)-1$ symbols before the PUSCH transmission occasion $i-i_0$ on the active UL BWP b of the carrier f of the serving cell c and $K_{PUSCH}(i)$ symbols before the PUSCH transmission occasion i, for the PUSCH power control adjustment state l. $i_0$ may represent the smallest positive integer when $K_{PUSCH}(i-i_0)$ symbols before the PUSCH transmission occasion $i-i_0$ is earlier than $K_{PUSCH}(i)$ symbols before the PUSCH transmission occasion i.

When the PUSCH transmission is scheduled by DCI format 0_0 or DCI format 0_1, $K_{PUSCH}(i)$ may represent the number of symbols in the active UL BWP b of the carrier f of the serving cell c that is later than a last symbol of the corresponding PDCCH reception and before an initial symbol of the PUSCH transmission. When the PUSCH transmission is configured by configured grant configuration information (ConfiguredGrantConfig), $K_{PUSCH}(i)$ may represent the number of $K_{PUSCH, min}$ symbols that is equal to a product of the number of symbols $N_{symb}^{slot}$ per slot in the active UL BWP b of the carrier f of the serving cell c and a minimum value of values provided by k2 in PUSCH common configuration information (PUSCH-ConfigCommon).

Whether the power control adjustment state has a plurality of states (for example, two states) or a single state may be configured by the higher layer parameter. In a case that a plurality of power control adjustment states are configured, one of the plurality of power control adjustment states may be identified by the index l (for example, l∈{0, 1}).

Note that Equations (1) and (2) are merely examples, without limitation. So long as the user terminal controls the PUSCH transmission power on the basis of at least one parameter shown in Equations (1) and (2), additional parameters may be included, or some parameters may be omitted. In Equations (1) and (2) described above, the PUSCH transmission power is controlled per active UL BWP of a carrier of a serving cell, without limitation. At least some of the serving cell, the carrier, the BWP, and the power control adjustment state may be omitted.

<PUCCH Transmission Power Control>

In NR, a PUCCH transmission power is controlled on the basis of a TPC command (also referred to as a value, increase-decrease value, correction value, indication value, or the like) indicated by a certain field in the DCI (also referred to as a TPC command field, a first field, or the like).

For example, a PUCCH transmission power $(P_{PUCCH, b, f, c}(i, q_u, q_d, l))$ in a PUCCH transmission occasion i (also referred to as transmission duration or the like) on the active UL BWP b of the carrier f of the serving cell c may be expressed by Equation (3) below, using the index l of the power control adjustment state (PUCCH power control adjustment state). The power control adjustment state may be referred to as a value based on the TPC command having the power control adjustment state index l, an accumulated value of the TPC command, and a value by a closed loop. l may be referred to as a closed loop index.

The PUCCH transmission occasion i is a duration in which a PUCCH is transmitted, and may include for example, one or more symbols, one or more slots, and the like.

[Math. 3]

$$P_{PUCCH,b,f,c}(i, q_u, q_d, l) = \min \begin{Bmatrix} P_{CMAX,f,c}(i), \\ P_{O\_PUCCH,b,f,c}(q_u) + 10\log_{10}(2^\mu \cdot M_{RB,b,f,c}^{PUCCH}(i)) + \\ PL_{b,f,c}(q_d) \cdot \Delta_{P\_PUCCH}(P) + \Delta_{TF,b,f,c}(i) + g_{b,f,c}(i, l) \end{Bmatrix}$$

Equation (3)

Here, $P_{CMAX, f, c}(i)$ represents, for example, a transmission power of a user terminal configured for the carrier f of the serving cell c in the transmission occasion i (also referred to as a maximum transmission power, a UE maximum output power, or the like). $P_{O\_PUCCH, b, f, c}(q_u)$ represents, for example, a parameter for a target received power configured for the active UL BWP b of the carrier f of the serving cell c in the transmission occasion i (also referred to as, for example, a parameter for a transmission power offset, a transmission power offset P0, a target received power parameter, or the like).

$M^{PUCCH}_{RB, b, f, c}(i)$ represents, for example, the number of resource blocks (bandwidth) allocated to a PUCCH for the transmission occasion i in the active UL BWP b of the carrier f of the serving cell c and a subcarrier spacing μ. $PL_{b, f, c}(q_d)$ represents, for example, a pathloss (pathloss estimation [dB], pathloss compensation) calculated by the user terminal using the index $q_d$ of a reference signal (pathloss reference RS, pathloss RS, PUCCH-PathlossReferenceRS) for downlink BWP associated with the active UL BWP b of the carrier f of the serving cell c.

When the UE is not provided with the pathloss reference RS (pathlossReferenceRSs), or before the UE is given the dedicated higher layer parameter, the UE may calculate a pathloss $PL_{b, f, c}(q_d)$ using an RS resource obtained from an SS/PBCH block that the UE uses to acquire the MIB.

When the UE is provided with pathloss reference RS information (pathlossReferenceRSs in the PUCCH power control information (PUCCH-PowerControl)), and is not provided with PUCCH spatial relation information (PUCCH-SpatialRelationInfo), the UE acquires a value of a reference signal in a PUCCH pathloss reference RS from a PUCCH pathloss reference RS-ID (PUCCH-PathlossReferenceRS-Id) having an index 0 in PUCCH pathloss reference RS information (PUCCH-PathlossReferenceRS). A resource for this reference signal is either on the same serving cell or, if provided, on a serving cell indicated by pathloss reference linking information (pathlossReferenceLinking). The pathloss reference linking information indicates whether the UE applies as the pathloss reference either DL of a special cell (SpCell) or of a secondary cell (SCell) corresponding to this UL. The SpCell may be a primary cell (PCell) in a master cell group (MCG) or a primary secondary cell (PSCell) in a secondary cell group (SCG). The pathloss reference RS information indicates a set of the reference signals (for example, CSI-RS configuration or SS/PBCH block) used for PUCCH pathloss estimation.

$\Delta_{F\_PUCCH}(F)$ represents a higher layer parameter given per PUCCH format. $\Delta_{TF, b, f, c}(i)$ represents a transmission power adjustment component for the UL BWP b of the carrier f of the serving cell c (offset).

$g_{b, f, c}(i, l)$ represents a value based on the TPC command having the power control adjustment state index l described above for the active UL BWP of the carrier f of the serving cell c and the transmission occasion i (for example, the power control adjustment state, an accumulated value of the TPC command, a value by a closed loop, or a PUCCH power adjustment state). For example, $g_{b, f, c}(i, l)$ may be expressed by Equation (4).

[Math. 4]

$$g_{b,f,c}(i, l) = g_{b,f,c}(i - i_0, l) + \sum_{m=0}^{C(C_i)-1} \delta_{PUCCH,b,f,c}(m, l)$$

Equation (4)

Here, $\delta_{PUCCH, b, f, c}(i, l)$ represents a TPC command value, which may be included in DCI format 1_0 or DCI format 1_1 the UE detects in the PUCCH transmission occasion i on the active UL BWP b of the carrier f of the serving cell c, or may be combined and coded with another TPC command in DCI format 2_2 having a CRC scrambled by a specific RNTI (Radio Network Temporary Identifier) (for example, TPC-PUSCH-RNTI).

$\sum_{m=0}^{C(C_i)-1} \delta_{PUCCH, b, f, c}(m, l)$ may represent a sum of TPC command values in a set $C_i$ of the TPC command values having cardinalities $C(C_i)$. $C_i$ may represent a set of TPC command values the UE receives between $K_{PUCCH}(i-i_0)-1$ symbols before the PUCCH transmission occasion $i-i_0$ on the active UL BWP b of the carrier f of the serving cell c and $K_{PUCCH}(i)$ symbols before the PUCCH transmission occasion i, for the PUCCH power control adjustment state l. $i_0$ may represent the smallest positive integer when $K_{PUCCH}(i-i_0)$ symbols before the PUSCH transmission occasion $i-i_0$ is earlier than $K_{PUCCH}(i)$ symbols before the PUSCH transmission occasion i.

When the PUCCH transmission depends on detection of DCI format 1_0 or DCI format 1_1 by the UE, $K_{PUCCH}(i)$ may represent the number of symbols in the active UL BWP b of the carrier f of the serving cell c that is later than a last symbol of the corresponding PDCCH reception and before an initial symbol of the PUCCH transmission. When the PUCCH transmission is configured by configured grant configuration information (ConfiguredGrantConfig), $K_{PUSCH}(i)$ may represent the number of $K_{PUCCH, min}$ symbols that is equal to a product of the number of symbols $N_{symb}^{slot}$ per slot in the active UL BWP b of the carrier f of the serving cell c and a minimum value of values provided by k2 in PUSCH common configuration information (PUSCH-ConfigCommon).

In a case that the UE is provided with information indicating that two PUCCH power control adjustment states are used (twoPUCCH-PC-AdjustmentStates) and the PUCCH spatial relation information (PUCCH-SpatialRelationInfo), l may be l={0, 1}, and in a case that the UE is not provided with the information indicating that two PUCCH power control adjustment states are used or the PUCCH spatial relation information, l may be l=0.

In a case that the UE obtains the TPC command value from DCI format 1_0 or 1_1, and the UE is provided with the PUCCH spatial relation information, the UE may obtain mapping between a PUCCH spatial relation information ID (pucch-SpatialRelationInfoId) value and a closed loop index (closedLoopIndex, power adjustment state index l) by an index provided by a PUCCH P0 ID (p0-PUCCH-Id in p0-Set in PUCCH-PowerControl in PUCCH-Config). In a case that the UE receives an activation command including the PUCCH spatial relation information ID value, the UE may determine a value of the closed loop index providing a value of l through a link to the corresponding PUCCH P0 ID.

In a case that the UE is provided with a configuration of a $P_{O\_PUCCH, b, f, c}(q_u)$ value for the corresponding PUCCH power adjustment state l on the active UL BWP b of the carrier f of the serving cell c by the higher layer, $g_{b, f, c}(i, l)=0$ and k=0, 1, . . . , i are satisfied. In a case that the UE is provided with the PUCCH spatial relation information, the UE may determine a value of l from a value of $q_u$ on the basis of the PUCCH spatial relation information associated with the PUCCH P0 ID corresponding to $q_u$ and the closed loop index value corresponding to l.

$q_u$ may represent the PUCCH P0 ID (p0-PUCCH-Id) indicating a PUCCH P0 (P0-PUCCH) in a PUCCH P0 set (p0-Set).

Note that Equations (3) and (4) are merely examples, without limitation. So long as the user terminal controls the PUCCH transmission power on the basis of at least one parameter shown in Equations (3) and (4), additional parameters may be included, or some parameters may be omitted. In Equations (3) and (4) described above, the PUCCH transmission power is controlled per active UL BWP of a carrier of a serving cell, without limitation. At least some of the serving cell, the carrier, the BWP, and the power control adjustment state may be omitted.

<SRS Transmission Power Control>

For example, an SRS transmission power ($P_{SRS, b, f, c}(i, q_s, l)$) in an SRS transmission occasion i (also referred to as transmission duration or the like) on the active UL BWP b of the carrier f of the serving cell c using the index l of the power control adjustment state may be expressed by Equation (5) below. The power control adjustment state may be referred to as a value based on the TPC command having the power control adjustment state index l, an accumulated value of the TPC command, and a value by a closed loop. l may be referred to as a closed loop index.

The SRS transmission occasion i is a duration in which an SRS is transmitted, and may include for example, one or more symbols, one or more slots, and the like.

[Math. 5]

Equation (5)

$$P_{SRS,b,f,c}(i, q_s, l) = \min \begin{cases} P_{CMAX,f,c}(i), \\ P_{O\_SRS,b,f,c}(q_s) + 10\log_{10}(2^\mu \cdot M_{SRS,b,f,c}(i)) + \\ \alpha_{SRS,b,f,c}(q_s) \cdot PL_{b,f,c}(q_d) + h_{b,f,c}(i, l) \end{cases}$$

Here, $P_{CMAX, f, c}(i)$ represents, for example, a UE maximum output power for the carrier f of the serving cell c in the SRS transmission occasion i. $P_{O\_SRS, b, f, c}(q_s)$ represents a parameter for a target received power provided by p0 for the active UL BWP b of the carrier f of the serving cell c and an SRS resource set $q_s$ (provided by SRS-ResourceSet and SRS-ResourceSetId) (also referred to as, for example, a parameter for a transmission power offset, a transmission power offset P0, a target received power parameter, or the like).

$M_{SRS, b, f, c}(i)$ represents an SRS bandwidth expressed by the number of resource blocks for the SRS transmission occasion i on the active UL BWP b of the carrier f of the serving cell c and the subcarrier spacing µ.

$\alpha_{SRS, b, f, c}(q_s)$ is provided by a (for example, alpha) for the active UL BWP b of the carrier f of the serving cell c and the subcarrier spacing µ, and the SRS resource set $q_s$.

$PL_{b, f, c}(q_d)$ represents a DL pathloss estimation value [dB](pathloss estimation [dB], pathloss compensation) calculated by the UE by using the RS resource index $q_d$ for an active DL BWP of the serving cell c and the SRS resource set $q_s$. The RS resource index $q_d$ represents the pathloss reference RS (pathloss RS, provided by, for example, pathlossReferenceRS) associated with SRS resource set $q_s$, and is an SS/PBCH block index (for example, ssb-Index) or a CSI-RS resource index (for example, csi-RS-Index).

When the UE is not provided with the pathloss reference RS (pathlossReferenceRSs), or before the UE is given the dedicated higher layer parameter, the UE calculates $PL_{b, f, c}(q_d)$ by using an RS resource obtained from an SS/PBCH block that the UE uses to acquire the MIB.

$h_{b, f, c}(i, l)$ represents an SRS power control adjustment state for the active UL BWP of the carrier f of the serving cell c in the SRS transmission occasion i. In a case that a configuration of the SRS power control adjustment state (for example, srs-PowerControlAdjustmentStates) indicates the same power control adjustment state for an SRS transmission and a PUSCH transmission, the state is a current PUSCH power control adjustment state $f_{b, f, c}(i, l)$. On the other hand, in a case that the configuration of the SRS power control adjustment state indicates independent power control adjustment states for an SRS transmission and a PUSCH transmission, and a TPC accumulation configuration is not provided, the SRS power control adjustment state $h_{b,f,c}(i)$ may be expressed by Equation (6).

[Math. 6]

$$h_{b,f,c}(i) = h_{b,f,c}(i-1) + \sum_{m=0}^{C(S_i)-1} \delta_{SRS,b,f,c}(m) \quad \text{Equation (6)}$$

Here, $\delta_{SRS,b,f,c}(m)$ may be a TPC command value combined and coded with another TPC command in a PDCCH having the DCI (for example, DCI format 2_3). $\Sigma_{m=0}^{C(S_i)-1} \delta_{SRS,b,f,c}(m)$ may represent a sum of TPC commands in a set $S_i$ of TPC command values having cardinalities $C(S_i)$ received by the UE between $K_{SRS}(i-i_0)-1$ symbols before an SRS transmission occasion $i-i_0$ and $K_{SRS}(i)$ symbols before the SRS transmission occasion i on the active UL BWP b of the carrier f of the serving cell c and the subcarrier spacing μ. Here, $i_0$ may represent the smallest positive integer when $K_{SRS}(i-i_0)-1$ symbols before the SRS transmission occasion $i-i_0$ is earlier than $K_{SRS}(i)$ symbols before the SRS transmission occasion i.

When the SRS transmission is aperiodic, $K_{SRS}(i)$ may represent the number of symbols in the active UL BWP b of the carrier f of the serving cell c that is later than a last symbol of the corresponding PDCCH triggering the SRS transmission and before an initial symbol of the SRS transmission. When the SRS transmission is semi-persistent or periodic, $K_{SRS}(i)$ may represent the number of $K_{SRS, min}$ symbols that is equal to a product of the number of symbols $N_{symb}^{slot}$ per slot in the active UL BWP b of the carrier f of the serving cell c and a minimum value of values provided by k2 in PUSCH common configuration information (PUSCH-ConfigCommon).

Note that Equations (5) and (6) are merely examples, without limitation. So long as the user terminal controls the SRS transmission power on the basis of at least one parameter shown in Equations (5) and (6), additional parameters may be included, or some parameters may be omitted. In Equations (5) and (6) described above, the SRS transmission power is controlled per BWP of a carrier of a serving cell, without limitation. At least some of the cell, the carrier, the BWP, and the power control adjustment state may be omitted.

(Pathloss RS)

A study is underway whether to change an existing mechanism of higher layer filtered RSRP for the pathloss measurement in a case that the pathloss RS is updated by the MAC CE.

In the case that the pathloss RS is updated by the MAC CE, pathloss measurement based on L1-RSRP may be applied. The higher layer filtered RSRP may be used for the pathloss measurement at an available timing after the MAC CE for update of update of the pathloss RS, and the L1-RSRP may be used for the pathloss measurement before the higher layer filtered RSRP is applied. The higher layer filtered RSRP may be used for the pathloss measurement at an available timing after the MAC CE for update of the pathloss RS, and higher layer filtered RSRP for a previous pathloss RS may be used before the available timing. Similar to the operation in Rel. 15, the higher layer filtered RSRP may be used for the pathloss measurement, and the UE may follow all pathloss RS candidates configured by the RRC. The maximum number of pathloss RSs configurable by the RRC may depend on UE capability. In a case that the maximum number of pathloss RSs configurable by the RRC is X, not more than X pathloss RS candidates may be configured by the RRC, and a pathloss RS may be selected by the MAC CE from among the configured pathloss RS candidates. The maximum number of pathloss RSs configurable by the RRC may be 4, 8, 16, 64, or the like.

(Measurement Delay Requirement)

Measurement delay requirements for intra-frequency measurement are defined for radio resource management (RRM) measurement for layer 3 (L3) mobility. As shown in FIG. 1, the measurement delay requirement is defined for each of cell detection, RSRP measurement, and SSB index detection.

Here, $M_{pss/sss\_sync\_w/o\_gaps}$ is 40 for the UE supporting FR2 power class 1, 24 for the UE supporting power class 2, 24 for the UE supporting FR2 power class 3, and 24 for the UE supporting FR2 power class 4. $M_{meas\_period\_w/o\_gaps}$ is 40 for the UE supporting power class 1, 24 for the UE supporting FR2 power class 2, 24 for the UE supporting power class 3, and 24 for the UE supporting power class 4. In a case that an intra-frequency SSB measurement timing configuration (SMTC) does not completely overlap a measurement gap (MG), or the intra-frequency SMTC completely overlaps the MG, $K_p$ is $K_p=1$. In a case that the intra-frequency SMTC partially overlaps the MG, $K_p$ is, by using a measurement gap repetition period (MGRP), $K_p=1/(1-(\text{SMTC period/MGRP}))$ where SMTC period<MGRP. $K_{RLM}(K_{layer\ 1\_measurement})$ is 1 or 1.5 depending on a relation between all of the reference signals configured for radio link monitoring (RLM)), beam failure detection (BFD), candidate beam detection (CBD)), or L1-RSRP for beam reporting outside the MG and an intra-frequency SMTC occasion. $CSSF_{intra}$ represents a carrier-specific scaling factor.

In a case of with DRX and a DRX cycle equal to or less than 320 ms, a DRX on duration and a misalignment of a SMTC window are taken into consideration to perform multiplying by 1.5 within a ceil function.

In LTE, because measurement is always possible by the CRS, the measurement delay requirement is cell detection and synchronization of 600 ms+RSRP measurement of 200 ms=fixed value of 800 ms. In NR, in view of UE power consumption recommendation, in order to prevent unnecessarily high frequent measurement, the LTE cell detection of 600 ms and the LTE RSRP measurement of 200 ms are defined as lower limit values. In NR, the SMTC periodicity is configurable, and thus, the measurement delay requirement depending on the SMTC periodicity is applied.

(L1-RSRP Measurement/Reporting)

The UE measures a value of layer 1 (L1)-RSRP for each RS configured by the RRC (each base station transmit beam).

A measurement period is defined for each L1-RSRP reporting, the measurement period indicating within how many immediately preceding samples the L1-RSRP measurement needs to be completed. Assume that the number of samples used for the RSRP measurement for one L1-RSRP reporting is represented by M, the scaling factor in consideration of overlapping with the SMTC or the measurement gap (MG) is represented by P, the scaling factor in consideration of UE receive beam switching is represented by N, and a transmission periodicity of the SSB of the CSI-RS is an RS transmission periodicity, a measurement period T in FR1 is expressed as M×P×RS transmission periodicity, and a measurement period T in FR2 is expressed as M×N×P×RS transmission periodicity.

Here, as shown in FIG. 2A, in a case that time domain measurement restriction for channel (signal) measurement (timeRestrictionForChannelMeasurements) is configured, or an RS for L1-RSRP measurement is an aperiodic CSI-RS, M is M=1, and otherwise, M is M=3. As shown in FIG. 2B, in a case that the L1-RSRP reporting is based on the CSI-RS, N is N=1, in a case that the L1-RSRP reporting is based on the SSB, N is N=8, and in a case that the L1-RSRP reporting is based on CSI-RS with repetition and the number of CSI-RS resources is smaller than the maximum number of receive beams (maxNumberRxBeam), N is N=ceil (maxNumberRxBeam/the number of CSI-RS resources).

L1-RSRP measurement accuracy based on one sample measurement is defined. Whether or not the RSRP is averaged in L1 may depend on UE implementation. When the time domain measurement restriction for channel measurement is configured, the UE reports one sample of RSRP as an L1-RSRP measurement result without using the averaging.

FIG. 3A shows an FR1 SSB-based L1-RSRP measurement period $T_{L1\text{-}RSRP\_Measurement\_Period\_SSB}$. FIG. 3B shows an FR2 SSB-based L1-RSRP measurement period $T_{L1\text{-}RSRP\_Measurement\_Period\_SSB}$. Here, $T_{SSB}$=ssb-periodicity-ServingCell represents a periodicity of an SSB index configured for the L1-RSRP measurement. $T_{DR}$<represents a DRX cycle length. $T_{Report}$ represents a periodicity configured for reporting.

FIG. 4A shows an FR1 CSI-RS-based L1-RSRP measurement period $T_{L1\text{-}RSRP\_Measurement\_Period\_CSI\text{-}RS}$. FIG. 4B shows an FR2 CSI-RS-based L1-RSRP measurement period $T_{L1\text{-}RSRP\_Measurement\_Period\_CSI\text{-}RS}$. $T_{CSI\text{-}RS}$ represents a periodicity of a CSI-RS configured for the L1-RSRP measurement. This requirement is applicable to a case that the CSI-RS configured for the L1-RSRP measurement is transmitted with Density=3.

However, there may be a case that a pathloss cannot be appropriately calculated using an L1-RSRP. For example, when timeRestrictionForChannelMeasurements is configured, or when a pathloss RS is an aperiodic CSI-RS, an L1-RSRP is a measurement result of one sample, and thus, an effect of instantaneous fading may vary the measurement result to possibly reduce the accuracy of pathloss.

As such, the inventors of the present invention came up with the idea of a method for appropriately calculating the pathloss using the L1-RSRP.

Hereinafter, embodiments according to the present disclosure will be described in detail with reference to the drawings. The radio communication methods according to respective embodiments may each be employed individually, or may be employed in combination.

In the present disclosure, UL transmission, UL signal, UL channel, PUSCH, PUCCH, SRS, P-SRS, SP-SRS, and A-SRS may be interchangeably interpreted.

In the present disclosure, pathloss RS, pathloss reference RS, RS for pathloss reference, RS of pathloss estimation, RS for pathloss calculation, pathloss (PL)-RS, index $q_d$, RS used for pathloss calculation, RS resource used for pathloss calculation, calculation RS, SSB, CSI-RS, and DL-RS may be interchangeably interpreted. Calculation, estimation, and measurement may be interchangeably interpreted.

(Radio Communication Method)

When a pathloss RS is updated by the MAC CE, and an L1-RSRP application condition is met, the UE may calculate a pathloss for the transmission power control (UL transmission) on the basis of the L1-RSRP for the pathloss RS. Pathloss RS and RS for L1-RSRP measurement may be interchangeably interpreted. The pathloss RS may be any of SSB, CSI-RS, periodic CSI-RS, semi-persistent CSI-RS, and aperiodic CSI-RS.

For example, as shown in FIG. 5, when a pathloss RS is not updated by the MAC CE (S10: N), the UE may calculate a pathloss on the basis of higher layer filtered RSRP for the pathloss RS (S30). When a pathloss RS is updated by the MAC CE (S10: Y), and the L1-RSRP application condition is not met (S20: N), the UE may calculate a pathloss on the basis of the higher layer filtered RSRP for the pathloss RS (S30). When a pathloss RS is updated by the MAC CE, the UE may expect that the L1-RSRP application condition is met. When a pathloss RS is updated by the MAC CE (S10: Y), and the L1-RSRP application condition is met (S20: Y), the UE may calculate a pathloss on the basis of the L1-RSRP for the pathloss RS (S40).

The L1-RSRP application condition may include a condition that the number M of RSRP measurements (the number of samples) or the measurement period T is equal to or more than a measurement threshold. In the case that a pathloss RS is updated by the MAC CE, the UE may not expect that the number M of RSRP measurements or the measurement period T is less than the measurement threshold. When a pathloss RS is updated by the MAC CE, and the number M of RSRP measurements or the measurement period T is less than the measurement threshold, the UE may calculate a pathloss using the higher layer filtered RSRP. The measurement threshold may differ depending on a frequency range. For example, the measurement threshold in FR2 may, in consideration of receive beam sweeping, larger than a threshold in FR1, or N times the measurement threshold in FR1. The measurement period T may be a function of at least one of M, N, P, and RS transmission periodicity, as described above.

The L1-RSRP application condition may include a condition that the time domain measurement restriction for channel measurement (timeRestrictionForChannelMeasurements) is not configured, or a condition that the pathloss RS is not an aperiodic CSI-RS. When a pathloss RS is updated by the MAC CE, the UE may not expect that the time domain measurement restriction for channel measurement is configured. When a pathloss RS is updated by the MAC CE, the UE may not expect that the pathloss RS is an aperiodic CSI-RS. In the case that the time domain measurement restriction for channel measurement is configured, the UE may calculate a pathloss using the higher layer filtered RSRP. In the case that a pathloss RS is an aperiodic CSI-RS, the UE may calculate a pathloss using the higher layer filtered RSRP.

The L1-RSRP application condition may include a condition that an RS for L1-RSRP measurement is an SSB. When a pathloss RS is updated by the MAC CE, the UE may not expect that an RS for L1-RSRP measurement is a CSI-RS. When a pathloss RS is updated by the MAC CE, and an RS for L1-RSRP measurement is a CSI-RS, the UE may calculate a pathloss using the higher layer filtered RSRP.

The L1-RSRP application condition may include a condition that a frequency of a pathloss RS (a corresponding UL transmission) is within a specific frequency range (FR).

The L1-RSRP application condition may include a condition that a frequency of a pathloss RS (a corresponding UL transmission) is FR1. When a pathloss RS is updated by the MAC CE, the UE may not expect that a frequency of the pathloss RS is FR2. When a pathloss RS is updated by the MAC CE, and a frequency of the pathloss RS is FR2, the UE may calculate a pathloss using the higher layer filtered RSRP. Because a subcarrier spacing in FR1 is smaller than a subcarrier spacing in FR2, it can be thought that a sample time length in FR1 is longer than a sample time length in FR2, and the effect of the instantaneous fading is smaller.

The L1-RSRP application condition may include a condition that a frequency of a pathloss RS (a corresponding UL transmission) is FR2. When a pathloss RS is updated by the MAC CE, the UE may not expect that a frequency of the pathloss RS is FR1. When a pathloss RS is updated by the MAC CE, and a frequency of the pathloss RS is FR1, the UE may calculate a pathloss using the higher layer filtered RSRP. Because a plurality of base station transmit beams and a plurality of UE receive beams are switched in FR2, it can be thought that the pathloss RS is switched by the MAC CE to match the DL and UL beams.

The L1-RSRP application condition may include a condition that a resource for a pathloss RS meets the resource condition. The condition that a resource for a pathloss RS meets a resource condition may include a condition that a resource amount for the pathloss RS is within a resource amount range. The L1-RSRP application condition may include a condition that a pathloss RS is a CSI-RS, and a resource for the CSI-RS meets the resource condition. When a pathloss RS is updated by the MAC CE, the UE may not expect that a resource for the pathloss RS does not meet the resource condition. When a pathloss RS is updated by the MAC CE, and a resource for the pathloss RS does not meet the resource condition, the UE may calculate a pathloss using the higher layer filtered RSRP.

The condition that a resource amount of a pathloss RS is within a resource amount range may include at least one of a condition that the number of antenna ports configured for the pathloss RS is equal to or more than a resource amount threshold, a condition that a density configured for the pathloss RS is equal to or more than the resource amount threshold, a condition that a density configured for the pathloss RS has a specific value (for example, 3), a condition that the number of physical resource blocks (PRBs) configured for the pathloss RS is equal to or more than the resource amount threshold, a condition that a transmission periodicity of the pathloss RS is equal to or less than the resource amount threshold, and a condition that a transmission periodicity of the pathloss RS is equal to or more than the resource amount threshold.

According to the embodiments described above, even in the case that the UE calculates the pathloss using the L1-RSRP, the calculation accuracy of the pathloss can be prevented from reducing.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 6:
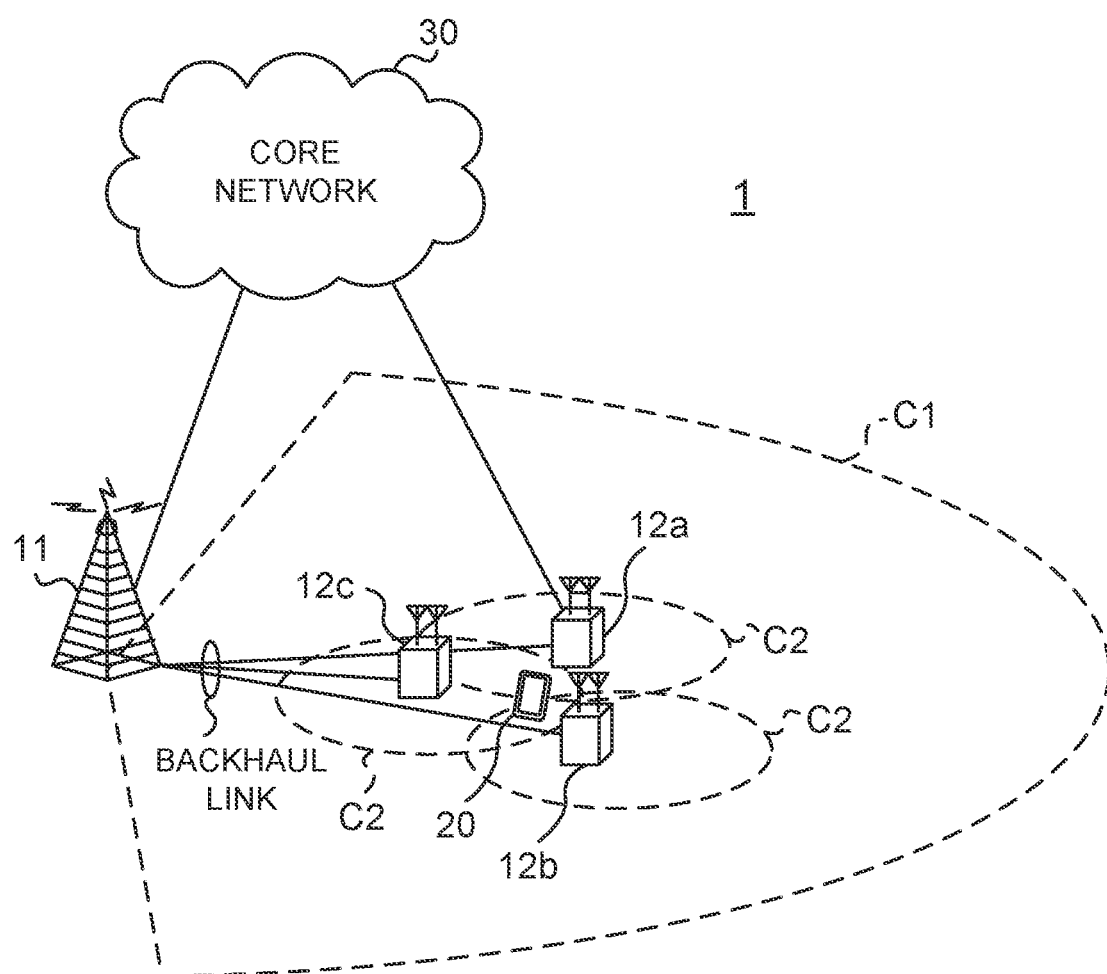
FIG. 6 is a diagram to show an example of a schematic structure of a radio communication system according to one embodiment.

FIG. 6 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 7:
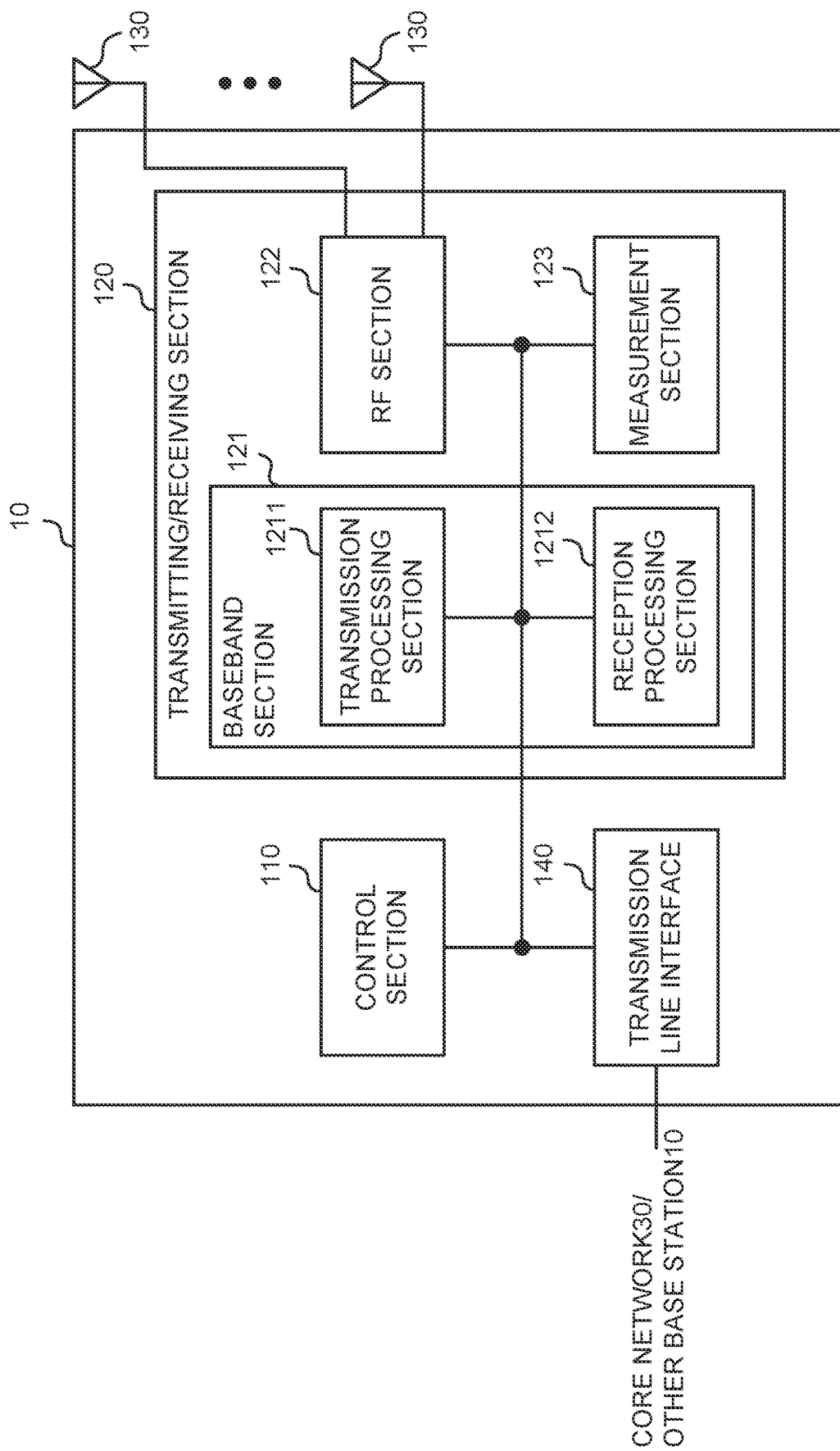
FIG. 7 is a diagram to show an example of a structure of a base station according to one embodiment.

FIG. 7 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate a bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

(User Terminal)

Figure 8:
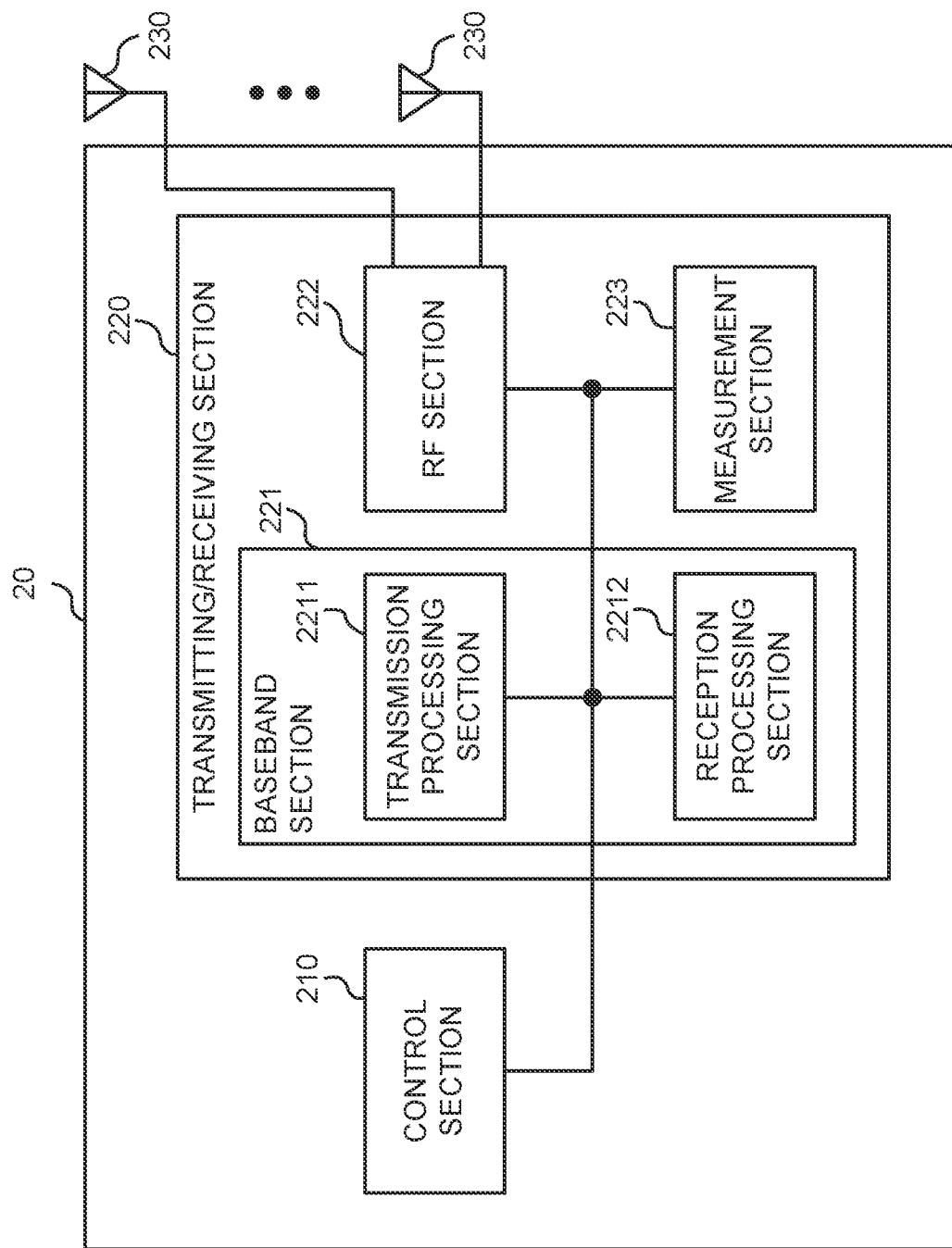
FIG. 8 is a diagram to show an example of a structure of a user terminal according to one embodiment.

FIG. 8 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate a bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may receive a pathloss reference signal. The control section 210 may calculate a pathloss for transmission power control on the basis of layer 1 (L1)-reference signal received power (RSRP) for the pathloss reference signal when the pathloss reference signal is updated by a media access control-control element (MAC CE), and a measurement condition is met.

The measurement condition may include at least one of a condition that the number of RSRP measurements or a measurement period is equal to or more than a measurement threshold, a condition that time domain measurement restriction for channel measurement is not configured, a condition that the pathloss reference signal is not an aperiodic channel state information reference signal (CSI-RS), a condition that the pathloss reference signal is a synchronization signal block, a condition that a frequency of the pathloss reference signal is within a specific frequency range, and a condition that a resource amount of the pathloss reference signal is within a resource amount range.

When the pathloss reference signal is updated by the media access control-control element (MAC CE), and the measurement condition is not met, the control section 210 may calculate the pathloss on the basis of higher layer filtered RSRP.

When the pathloss reference signal is updated by the media access control-control element (MAC CE), the control section 210 may expect that the measurement condition is met.

The resource amount may be at least one of the number of antenna ports, a density, the number of physical resource blocks, and a transmission periodicity.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining software into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 9:
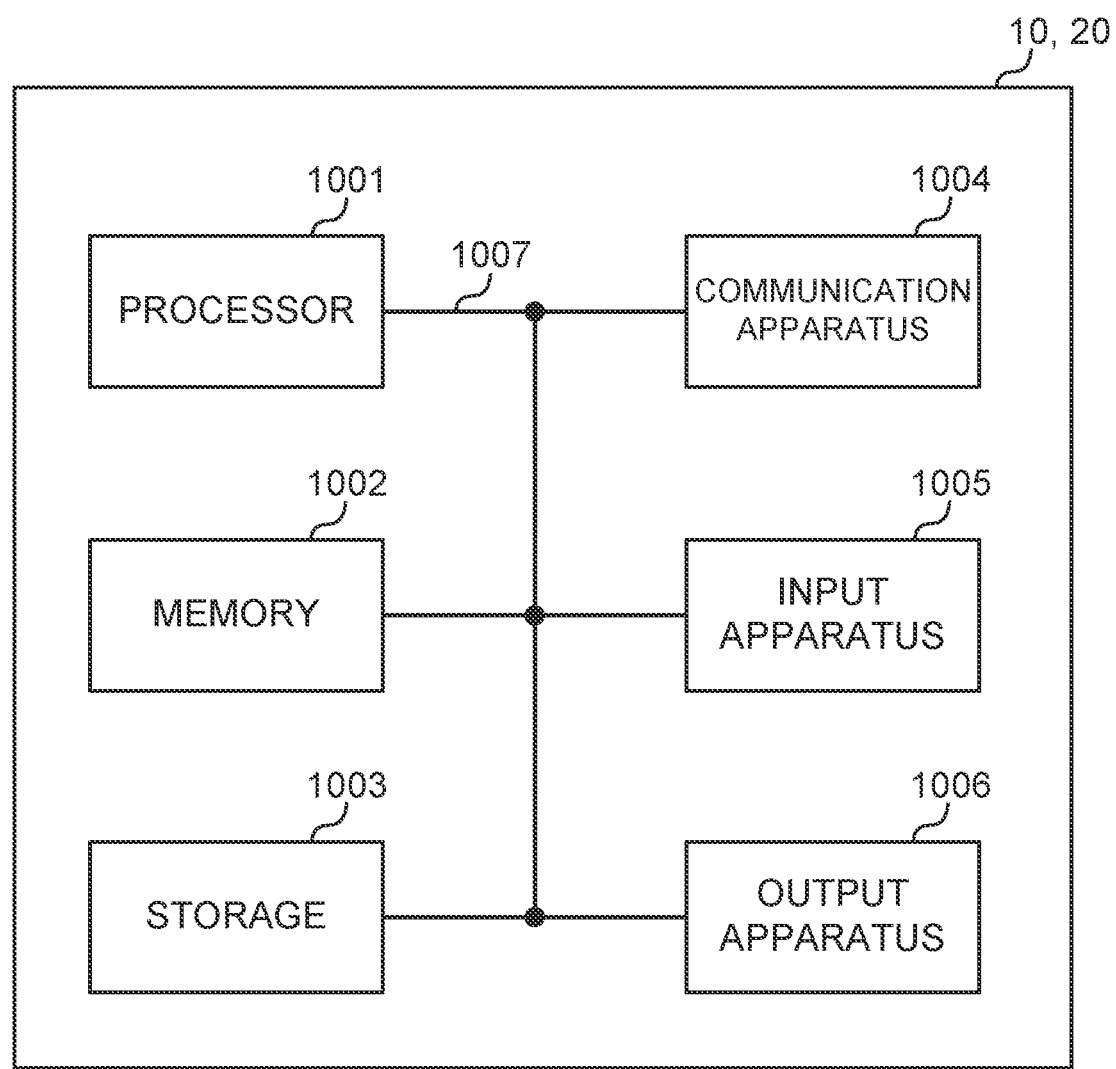
FIG. 9 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 9 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk, a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." N The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
   a receiver that receives a medium access control (MAC) control element (CE) for updating a pathloss reference signal; and
   a processor that measures a layer 1 reference signal received power (L1-RSRP) of the updated pathloss reference signal, and, in response to the receiving of the MAC CE, applies the updated pathloss reference signal to calculation of a pathloss after a time greater than or equal to a time of M samples of the updated pathloss reference signal, which is based on a periodicity of the updated pathloss reference signal, wherein the time of M samples varies depending on whether a frequency range of the updated pathloss reference signal is a first frequency band or a second frequency band which is higher than the first frequency band, and wherein M is a positive integer.

2. A radio communication method for a terminal, comprising:

receiving a medium access control (MAC) control element (CE) for updating a pathloss reference signal;

measuring a layer 1 reference signal received power (L1-RSRP) of the updated pathloss reference signal; and in response to the receiving of the MAC CE, applying the updated pathloss reference signal to calculation of a pathloss after a time greater than or equal to a time of M samples of the updated pathloss reference signal, which is based on a periodicity of the updated pathloss reference signal, wherein the time of M samples varies depending on whether a frequency range of the updated pathloss reference signal is a first frequency band or a second frequency band which is higher than the first frequency band, and wherein M is a positive integer.

3. A base station comprising:

a transmitter that transmits, to a terminal, a medium access control (MAC) control element (CE) for updating a pathloss reference signal, a layer 1 reference signal received power (L1-RSRP) of the updated pathloss reference signal being measured; and a processor that controls reception of an uplink signal based on a pathloss, to which the updated pathloss reference signal has been applied in response to a reception of the MAC CE at the terminal, after a time greater than or equal to a time of M samples of the updated pathloss reference signal, which is based on a periodicity of the updated pathloss reference signal, wherein the time of M samples varies depending on whether a frequency range of the updated pathloss reference signal is a first frequency band or a second frequency band which is higher than the first frequency band, and wherein M is a positive integer.

4. A system comprising a terminal and a base station, wherein the terminal comprises:

a receiver that receives a medium access control (MAC) control element (CE) for updating a pathloss reference signal; and a processor that measures a layer 1 reference signal received power (L1-RSRP) of the updated pathloss reference signal, and, in response to the receiving of the MAC CE, applies the updated pathloss reference signal to calculation of a pathloss after a time greater than or equal to a time of M samples of the updated pathloss reference signal, which is based on a periodicity of the updated pathloss reference signal, wherein the time of M samples varies depending on whether a frequency range of the updated pathloss reference signal is a first frequency band or a second frequency band which is higher than the first frequency band, and wherein M is a positive integer, and the base station transmits the MAC CE.

\* \* \* \* \*